United States Patent
Brown

[15] 3,678,474
[45] July 18, 1972

[54] MARINE SPEEDOMETER AND ANEMOMETER WITH DIGITAL READOUT

[72] Inventor: Robert M. Brown, Lyndhurst, Ohio

[73] Assignees: Robert M. Brown; Computech, Inc., Lyndhurst, Ohio

[22] Filed: Sept. 3, 1970

[21] Appl. No.: 69,217

[52] U.S. Cl. .................340/173 R, 235/150.2, 235/103
[51] Int. Cl. .................................................G06f 15/50
[58] Field of Search .............235/150.2, 150.21, 103, 103.5, 235/104

[56] References Cited

UNITED STATES PATENTS

| | | |
|---|---|---|
| 2,133,133 | 10/1938 | Davis.................................235/104 |
| 2,514,948 | 7/1950 | Gross..................................235/104 |
| 3,496,343 | 2/1970 | Johanson............................235/103 |
| 2,803,400 | 8/1957 | Hickey............................235/150.21 |

Primary Examiner—Terrell W. Fears

[57] ABSTRACT

A marine speedometer and anemometer utilizing a common computer circuit and having an electro-luminescent display. A selector switch connects a pulse source and at the same time selects the proper computer circuits to produce a direct digital readout of ship or wind speed in knots or miles per hour. The pulses sources are a propeller device installed beneath the boat in the water and a cup or vane type anemometer rotor device mounted in the open where it can be driven by the wind. The digital display is mounted in a deep enclosure along with the computer circuitry and is fitted with a non-reflecting filter and window for protection against water and weather and to insure good legibility in bright or dark lighting.

7 Claims, 2 Drawing Figures

MARINE SPEEDOMETER AND ANEMOMETER WITH DIGITAL READOUT

BACKGROUND OF THE INVENTION

In the sailing and boating art it is very important to have an accurate knowledge of the boat speed through the water, and of the wind speed past the boat. To date, devices for providing this information have generally displayed instantaneous data on meter or dial type instruments. This data is often spurious, hard to read and inaccurate at low speeds. The devices or instruments are also sensitive to eddy currents and gusts with the result that readings are unsteady and difficult to interpret.

SUMMARY OF THE INVENTION

Accordingly, it is an object of this invention to provide, an easy-to-read digital format, boat speed and wind speed averaged over a finite period of time, thereby eliminating transient wind and water effects. Also, by displaying wind or water speed as determined by pulse data obtained over a period of time, a very high order of accuracy can be realized, making possible readings in tenths of knots or miles per hour. A common computer and display is used for economy. However, the use of additional components will permit a simultaneous display of wind and boat speed and also duplicate displays at other locations on the boat.

The foregoing features and advantages will become more apparent in light of the following detailed description and drawings of the invention.

BRIEF DESCRIPTION OF THE DRAWINGS

In FIG. 1, the propeller assembly 1 is mounted in the bottom of the boat 2. The free running propeller 1A with magnetic slugs 1B bonded into the hub is used to energize the magnetic reed switch 1C. The closing of the switch 1C is repeated at a rate which is directly proportional to the speed of the propeller 1B in the water. In a similar manner the anemometer rotor assembly 3 which rotates on its shaft 3A when the wind blows against the cups 3B causes the reed switch 3C to close each time the rotor magnets 3D revolve past. The switches are connected to the computer 4 by means of the cables 5 and 6. The selector switch 7, mounted on the front of the digital readout assembly 8, is used to select the wind or ship speed range, switch on power to the computer circuit from the power source 9, and to connect one of the cable inputs 5 or 6 to the computing circuit 4. The computing circuitry 4 will, depending on the range selected by switch 7, convert the number of closings of the switches 1C or 3C to a digital display of speed on the electro-luminescent tubes 10.

Figure 1:
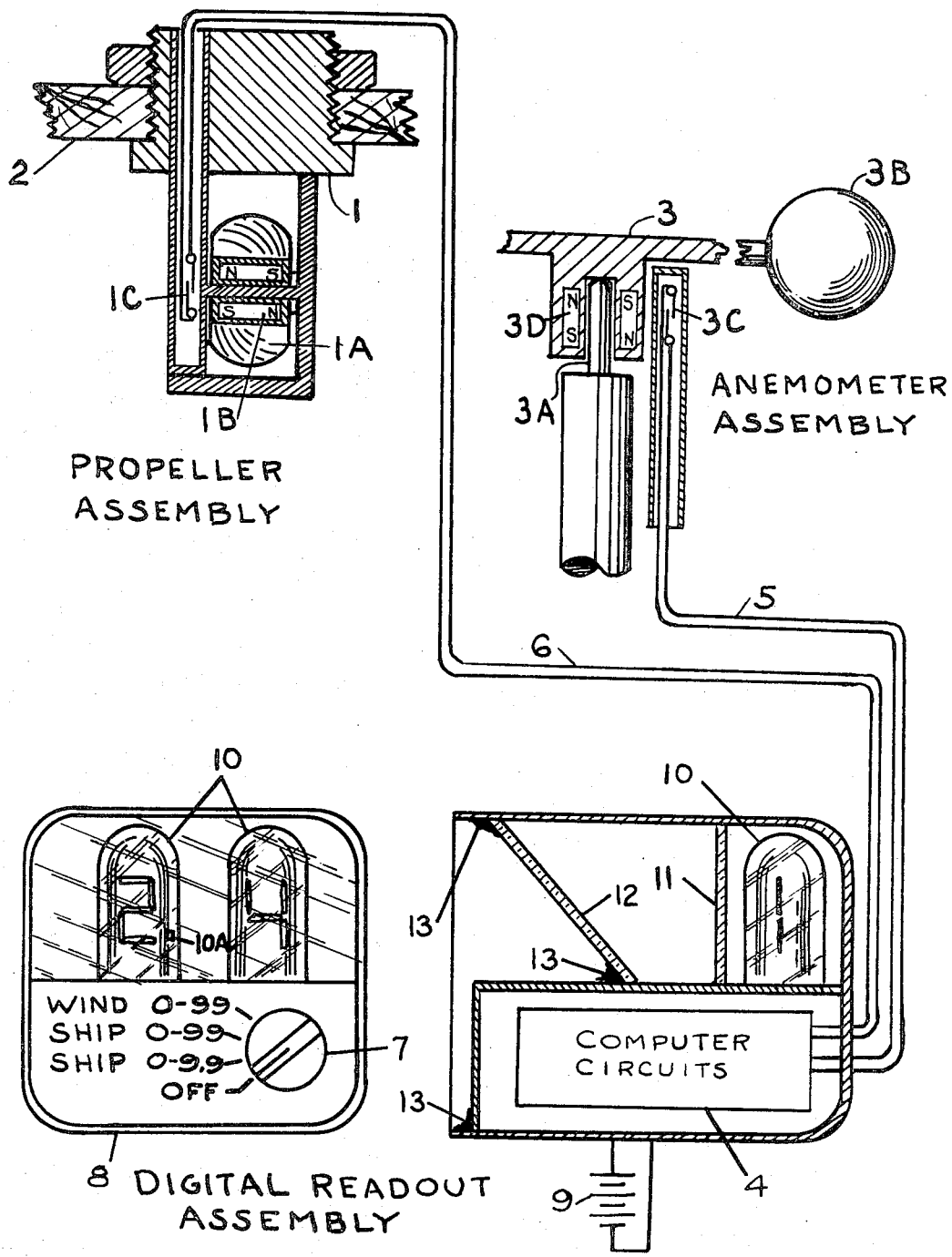
FIG. 1 illustrates the major components and features of the invention along with details of the interconnecting cabling.

The computer circuitry 4 which is enclosed in the digital display assembly 8 works in the following manner. The computer circuitry reshapes the switch signals from switches 1C or 3C to form sharp well-defined pulses. These pulses are then fed to a counter circuit which counts the total number of pulses generated in a period of time established by the range selected by the selector switch 7. The computer generates two pulses which signal the end of the count period and transfers into a storage register or memory bank the total number of pulses generated in the time period and resets the counter back to zero in preparation for the next count period. The count data in the storage register is then displayed by means of a decoder driver stage on a segmented type electroluminescent tube 10. The display is held constant for the entire new count period. At the end of this new count period the pulse count data in the storage register is replaced by the new count data and the counter reset to zero as before. The newly entered count data is now displayed by the decoder driver on the electro-luminescent tubes 10.

Because the count data is accumulated over a period of time, the display data represents a true average reading of speed for each sample period. The display is in the form of a sharp well-defined numeral formed by the segments of the electro-luminescent tubes 10 and is completely steady and unblinking, making possible easy error-free reading. To further enhance the readability of the display tubes a non-reflecting Polaroid film 11 is placed over the tubes to eliminate reflection or glare which might be produced on the glass tube envelope in bright sunlight. Protection of the display tubes and electronic circuitry is also insured by the positioning of a transparent window 12 over the opening and sealed with sealant 13 in the digital display enclosure 8. This window 12 is sloped at 45 degrees to prevent glare or reflections from its surface from interfering with ease of reading.

High reading accuracy is possible with the digital readout because the time base or count period can be changed by means of the selector switch 7 to obtain larger or smaller pulse samples as desired. In the preferred embodiment shown in FIG. 1, the use of two display tubes is indicated for reasons of economy. As shown, the display is able to read out speeds of from 0 to 9.9 or 0 to 99 knots or miles per hour. In the first 0 to 9.9 range the selector switch is also used to switch on the decimal point 10A, thereby giving the ability to read in tenths of a knot or moles per hour. If the computer circuit were altered or adjusted to allow a count period equal to ten times that normally used in the 0 to 9.9 range, the device would then display 0 to .99 knots or miles per hour with an accuracy of a hundreth of a knot or mile per hour.

High accuracy is also possible because individual components such as the propeller assembly 1 and the anemometer assembly 3 can be accurately matched or calibrated after installation with the digital readout assembly 8 by means of adjustment potentiometers to allow for small variation in manufacture.

It may also be understood that other switching devices other than the reed switches 1C and 3C may be used to provide suitable input for the computer circuitry 4. Examples of these alternates are Hall effect devices, photovoltaic cells and lamps, variable reluctance devices, magneto type devices and mechanical switches. Similarly, other types of display tubes such as incandescent segmented lamps, neon or nixie numerical display lamps, fiber optic or light conductive plastic or glass segmented displays using individual incandescent bulbs for illumination could also be used.

Figure 2:
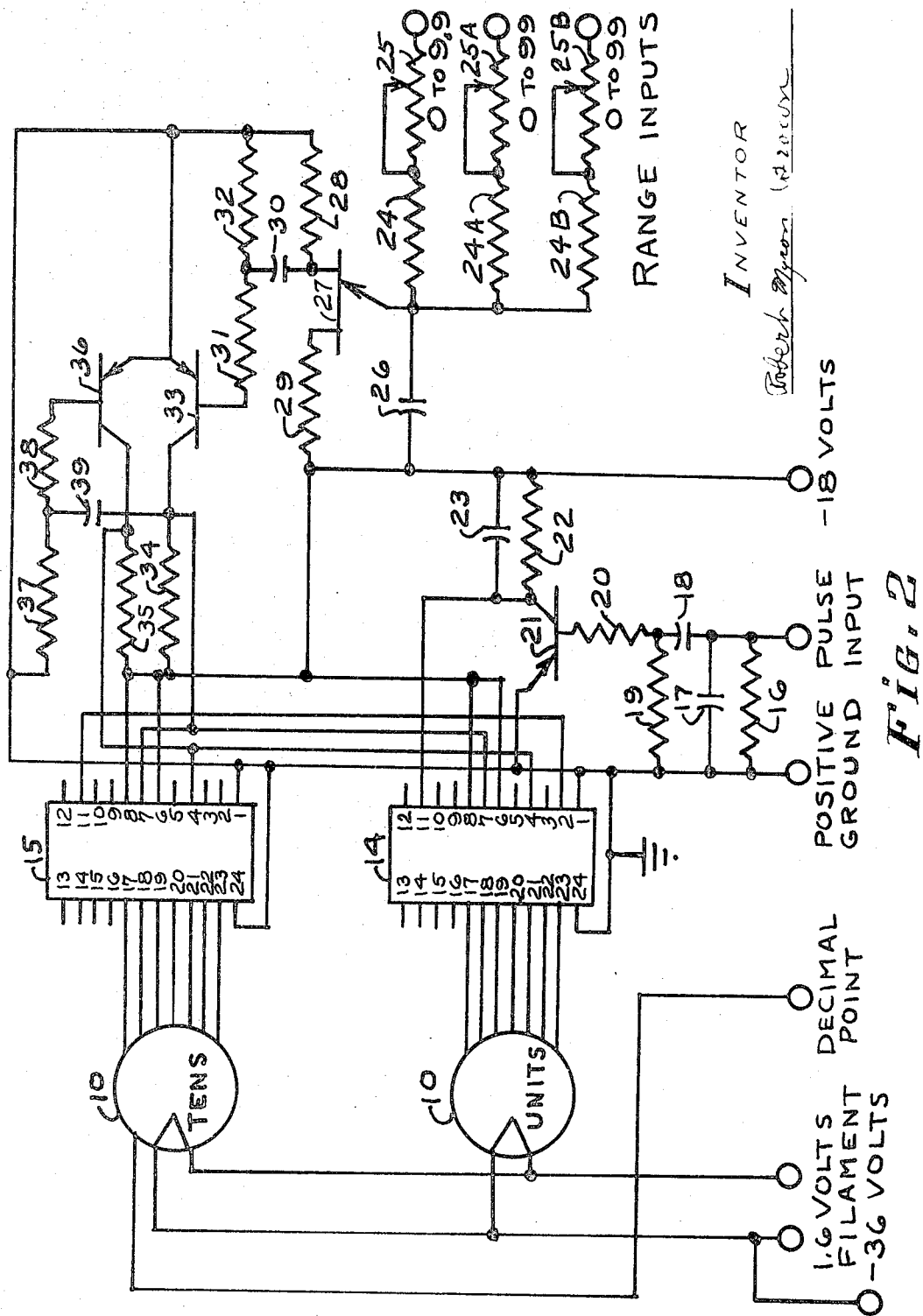
FIG. 2. illustrates, in schematic form, the basic computer circuitry which is used to produce the proper digital readout of boat or wind speed.

Details of the computer circuitry 4 in FIG. 1 are shown in the schematic diagram in FIG. 2. In this diagram the several inputs and power supply connections are made by means of the selector switch 7 in FIG. 1. The selector switch consists of two sections or decks, each of which has three poles with four positions including an OFF position. One of the decks is arranged to supply power to the circuit at −36 Volts DC, −18 Volts DC and 1.6 Volts DC for all three ON pole positions. These voltages provide the potentials necessary to illuminate the segments of the electro-luminescent tubes 10, provide power to the timing, pulse forming, and computer stages, and provide filament power to the electro-luminescent tubes 10.

One pole of the second selector switch 7 deck applies positive ground voltage to a selected range input. A second pole provides the means of connecting the cable 6 from the propeller assembly 1 to the pulse input terminal for switch positions 1 and 2. This second pole also connects cable 5 from the anemometer rotor assembly 3 to the pulse input terminal in position 3. The third pole of the second deck is used to apply −36 Volts DC to the dot input when the selector switch 7 is rotated to the first position, thereby providing the decimal point 10A in the readout tube 10 for the 0 to 9.9 range.

In an alternate design, a DC to DC converter is used to provide the several voltage inputs. In this case the selector switch 7 connects the power source 9 such as a 12 volt battery to the converter. The selector switch 7 continues to perform all other switching functions described.

The digital display tubes 10 are operated by means of the two monolithic integrated circuits 14 and 15 which drive the tubes 10 in the units and tens position, respectively. The integrated circuits 14 and 15 are designed to operate with seven segment numerical indicator tubes and contain a one decade up-down BCD counter, a storage register, a BCD to seven segment decoding matrix, and driver stage. The integrated circuits 14 and 15 which are commercially available from several sources is designed to perform the function of counting pulses generated by the switches 1C or 3C over a given period of time and upon a pulse command to enter the count total into a storage register and to display the count number on the electro-luminescent tubes 10. Another pulse command will reset the counter back to zero and allow a new count to be made over the next time period while the previous count is being displayed. Since the propeller 1A or rotor assembly 3 turn or rotate in direct proportion to water or wind speed, it is possible by proper selection or adjustment of the time period over which the count is taken to obtain a count total which is the exact equivalent of ship or wind speed in knots or miles per hour.

Closing of the switches 1C or 3C in FIG. 1 connects the negative voltage to the pulse input terminal in FIG. 2. This negative voltage is coupled by means of the filter formed by resistor 16 and capacitor 17 and the differentiating network formed by capacitor 18 and resistor 19 through resistor 20 to the base of transistor 21. Transistor 21 conducts, producing a sharp pulse across resistor 22 and capacitor 23 which is fed to the integrated circuit 14 counter input at pin 11. The pulses so entered are accumulated by the counter until a count of ten is reached. At this count the integrated circuit 14 produces a pulse on pin 2 which is coupled to pin 11 input of the integrated circuit 15. The count will continue in this manner until a command is given to enter the count into the storage register where it is held for decoding and displaying.

The time period is established by means of the unijunction 27 and its associated RC circuitry. The selector switch 7 applies positive voltage to a selected range input allowing a charge to build up on the capacitor 26 through resistor 24 and potentiometer 25. The unijunction 27 remains non-conductive until the capacitor 26 charge reaches the triggering level of the unijunction 27. At this time the unijunction 27 conducts, discharging the capacitor 26 through itself and the resistor 29 and generating a negative timing pulse across the resistor 28.

This timing pulse is coupled by the capacitor 30 and resistor 31 to the base of the transistor 33. Both transistor 27 and 33 are normally biased off by the resistors 37 and 32 which are connected to the positive ground. When the negative timing pulse is applied to the base of the transistor 33 it conducts, causing the voltage drop across the resistor 34 to increase. This voltage pulse is carried to pin 7 of the integrated circuits 14 and 15 to command the count total accumulated to be transferred to the storage register. When the pulse fed to the transistor 33 base ends, the transistor 33 ceases to conduct and the positive voltage pulse developed across the resistor 34 returns to a more negative value. This negative swing of the collector on transistor 33 is coupled by the capacitor 39 and resistor 38 to the base of the transistor 36 which in turn begins to conduct. A positive pulse is developed across the resistor 35 and fed to pin 4 of the integrated circuits 14 and 15 where it resets the counter circuit back to zero in preparation for the next count. After a short period determined by the values of the capacitor 39 and resistors 37 and 38, the transistor 36 will again turn off, restoring the circuit to its original state.

As the next count proceeds, the data entered in the storage register is decoded and displayed by the integrated circuits 14 and 15. The circuits function the same on all ranges. The only variation is in the timing period which is chosen with the selector switch 7.

The potentiometers 25 are used to make fine or vernier adjustments in the timing periods as required to compensate for installation or propeller or rotor component variations.

While the principles of the above invention have been described in connection with specific embodiments and particular modifications thereof, it is to be clearly understood that this description is made by way of example and not as a limitation of the scope of the invention; I claim 1. A digital readout boat speedometer-anemometer system, providing means for counting and displaying in velocity units the electrical pulses received from an anemometer device or a water speed device over a predetermined period, including; means for resetting the electrical pulse counting portion of the system to zero prior to starting a new counting period; means for signalling the count device to start counting after it has been reset; means for providing and selecting control signals from a plurality of predetermined count time interval circuits to provide a stop count signal after the selected time interval has elapsed; means for providing a signal to a storing device to store and display digitally the sum of counts made; means for steadily holding and displaying digitally the period count just made while the consecutive period count is being made; means for selecting and providing electrical pulses to the counter at a rate proportional to the velocity of either an anemometer or a water speed device; means for interlocking the said proper predetermined count time interval with the said selected velocity source such that the sum of the period count when displayed reads directly in standard velocity units whereby said system functions to select a velocity source, count its pulses over a selected time period, then store and convert this count to a digital display while a consecutive count is being made, thus a velocity reading is continuously displayed.

2. A system according to claim 1 which includes circuitry and trimming devices such that the predetermined time periods can be adjusted so that installation variations in the velocity indicators either anemometers or water speed devices can be compensated for and true velocity readings displayed, this same trimming device permits adjustment to display knots or miles per hour.

3. A system according to claim 1 in which the anemometer rotor for wind speed indication and submerged propeller for water speed indication provide pulses at a rate proportional to velocity, said rate being controlled by anemometer arm length and propeller angle and number of pulses generated by each revolution of same, said pulse rate chosen by design to provide updating of the display over intervals of 0.2 to 2.5 seconds to provide a pleasing and easily readable display without sacrifice of dynamic response and means to provide longer or shorter periods.

4. A system according to claim 1 in which since the air and water driven devices provide pulses per unit of velocity and the display is in units controlled directly by the time period control, and with a plurality of predetermined time periods different scale ranges are provided to be selected by the operator as desired, permitting the operator to select various wind or ship speed ranges as desired for display.

5. A system according to claim 1 including an electroluminescent display with shades and polarized filter to permit viewing of the digital display of speed in daylight or at night without supplementary illumination.

6. A system according to claim 1 which includes a conventional conversion circuit such that a single source of low voltage DC as available in small boats is also used to supply high voltages where required for proper operation, said circuit is designed for minimum consumption of electric power.

7. A system according to claim 1 which by sealing all cable and switch entries and enclosing the display with a transparent cover is completely sealed for use in a marine environment.

* * * * *